INVENTORS
HERBERT A. LASSEN
EDWARD A. WARD
BY
ATTORNEYS

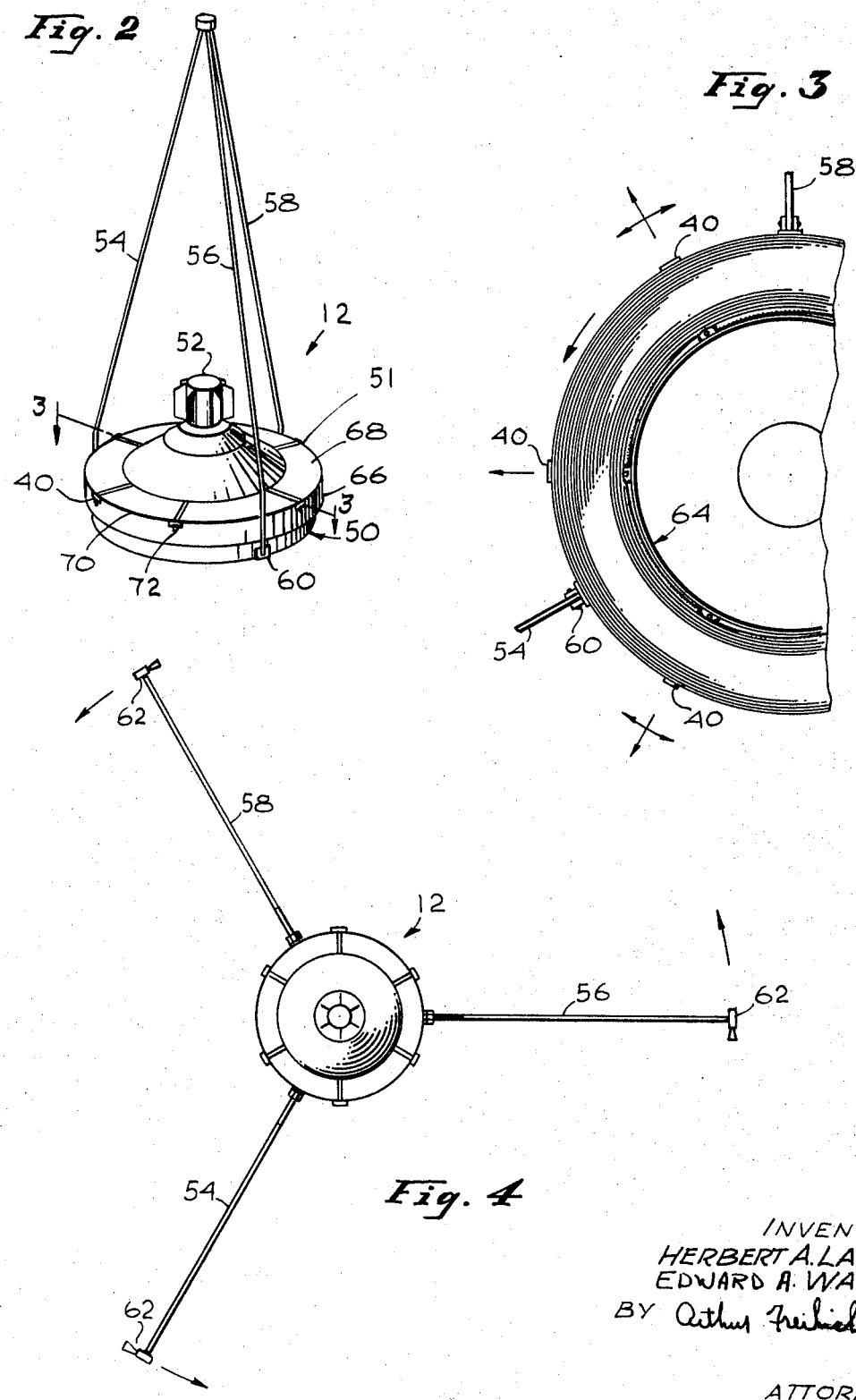

INVENTORS
HERBERT A. LASSEN
EDWARD A. WARD
BY Arthur Frielich
ATTORNEYS

Jan. 21, 1969 H. A. LASSEN ET AL 3,423,755
ANTENNA FORMED FILAMENTARY MATERIAL DEPLOYED
IN SPACE BY CENTRIFUGAL FORCE
Filed Jan. 24, 1966 Sheet 4 of 4

INVENTORS
HERBERT A. LASSEN
EDWARD A. WARD
BY Arthur Freilich
ATTORNEYS

United States Patent Office 3,423,755
Patented Jan. 21, 1969

3,423,755
ANTENNA FORMED OF FILAMENTARY MATERIAL DEPLOYED IN SPACE BY CENTRIFUGAL FORCE
Herbert A. Lassen, Los Angeles, and Edward A. Ward, Miraleste, Calif., assignors to TRW Inc., Redondo Beach, Calif., a corporation of Ohio
Filed Jan. 24, 1966, Ser. No. 522,492
U.S. Cl. 343—705
Int. Cl. H01q 1/28
18 Claims

ABSTRACT OF THE DISCLOSURE

A lightweight structure having a central spacecraft or hub supporting a net formed of a plurality of filamentary elements. The net has a plurality of elements which form a closed periphery that is coupled to the hub by a plurality of spoke elements. Before the structure is placed in orbit about the earth, the net is tightly wound about the hub. In space the structure is given an angular motion about its axis. In orbit the net is deployed by permitting it to unwind from the hub. Weights appropriately disposed along the net facilitate deployment. The angular motion of the hub provides a radial velocity to the elements of the net tending to peel the elements from the hub. Ultimately, the net will fully deploy with each of its elements being in tension as a consequence of the centrifugal force resulting from the angular motion of the hub. The centrifugal forces act to stabilize the net tending to maintain all of its elements in a single plane including the hub. The filamentary elements are lengths of flat tape which are wound about the hub. The faces of the tape are coated with an adhesive material providing a sticking force between the elements which assures that the net does not spontaneously unwind. The adhesive material also acts as a sink for the radially direct energy imparted to the elements by the spin velocity. Thus, the net is capable of unwinding in a slow controlled fashion thereby assuring that the radial velocity will be sufficiently small just prior to completion of unwinding to assure that the tensile strength of the elements is not exceeded. Coupling is provided for coupling the net spoke elements to the hub which permit limited rotational movement of the net about the hub. The coupling includes a damping mechanism for preventing the net from oscillating with respect to the hub.

---

This invention relates both to a method of deploying a large structure in space and to a structure capable of being so deployed.

During recent years a growing interest has developed in radio astronomical measurements of the sky at frequencies cut off by the earth's ionosphere, i.e. less than four megacycles. The lowest frequencies of interest are at the galactic cutoff, in the region of ten to one hundred kilocycles. It appears that the spectrum between ten kilocycles and one megacycle can only be effectively examined from an orbiting spacecraft. Such measurements would provide highly valuable scientific information about interstellar gas clouds, as well as long wave radio sources. Mapping of the sky backround at these frequencies appears to require a large antenna to achieve adequate angular resolution, preferably at high altitudes to minimize effects of the ionosphere and magnetosphere.

The need for large antennas or other large structures in space has thus far been partially satisfied by using inflatable or erectable structures. The inflatable structures which have their shapes stabilized following erection use either a plastic foam inserted between inner and outer layers of an envelope following inflation or alternatively materials which cold work hardens during erection.

Although these prior art techniques have proved to b useful, they apparently are not capable of deployin structures as large as are presently desired. For example it is now desired to deploy structures as large as man miles across.

In view of the foregoing, it is an object of the presen invention to provide a large lightweight structure capabl of being deployed in space.

It is an additional object of the present invention t provide a method suitable for deploying a large light weight structure in space.

The novel features that are considered characteristic of this invention are set forth with particularity in th appended claims. The invention itself will best be undei stood from the following description when read in cor nection with the accompanying drawings, in which:

FIGURE 2 is a perspective view of a structure in ac cordance with the present invention illustrated prior t the initiation of deployment;

FIGURE 3 is a horizontal sectional view taken sut stantially along the plane 3—3 of FIGURE 2;

FIGURE 4 is a perspective view of a spacecraft con prising a portion of a structure constructed in accordanc with the present invention;

Figure 1:
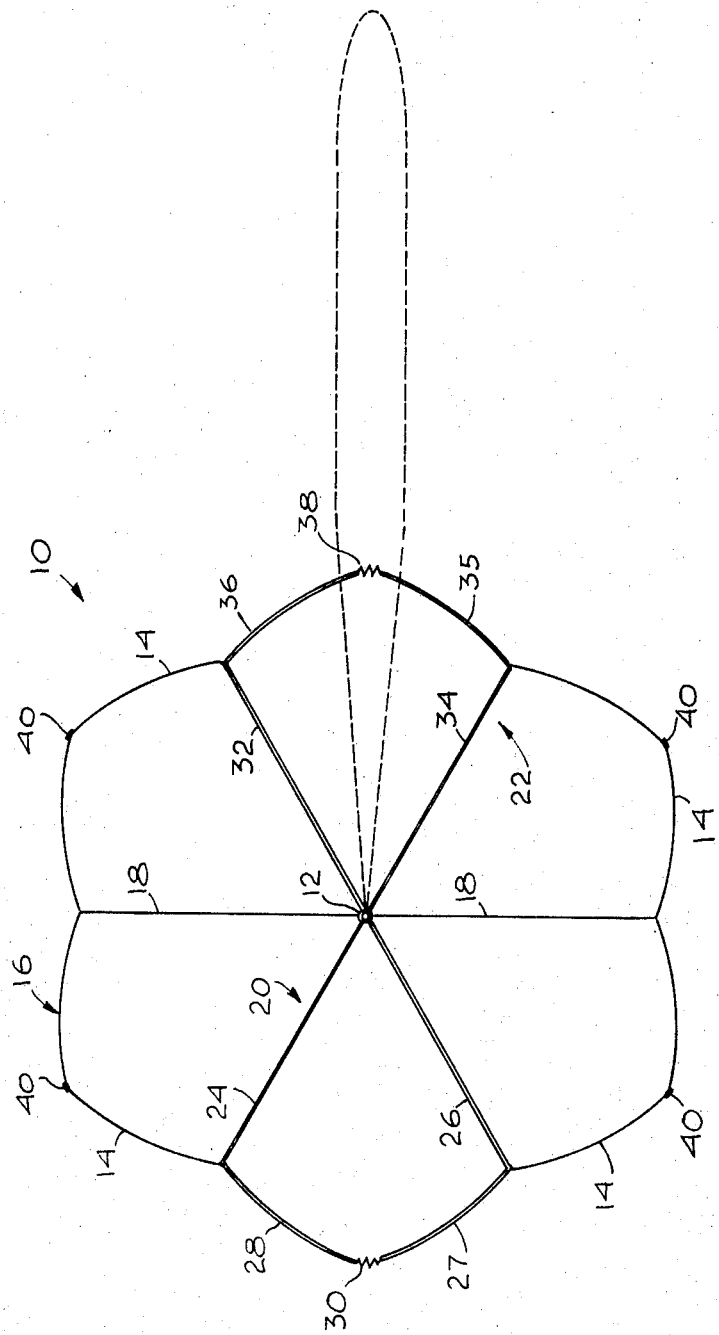
FIGURE 1 is a schematic diagram of a typical antenn structure constructed in accordance with the present ir vention.

Attention is now called to FIGURE 1 of the drawin; which schematically illustrates a typical large lightweigl antenna structure which it might be desired to place an orbit around the earth for radio astronomy purpose for example. As previously noted, applications do exi where it is desired that the structure be as large as sever. miles across. However, for purposes of explanation her in, it will be assumed that the antenna structure has maximum dimension across of approximately one mil In addition to it being desirable that the antenna structu: be large, it is of course also essential that it be light weight in order to enable it to be economically plac« in orbit.

More particularly, the antenna structure of FIGURE is seen to comprise a net 10 supported from a spacecra or hub 12. The net 10 is comprised of a first plurality filamentary elements 14 which are connected end to er to form a closed periphery 16. In addition to the clos« periphery 16, the net 10 includes a second plurality filamentary elements 18 which comprise spokes couplii the spacecraft 12 to the periphery 16.

The structure 10 of FIGURE 1 includes two antenna a semblies 20 and 22 each comprised of antenna elemen which form an integral part of the net structure. Mo particularly, the antenna assembly 20 is comprised conductive antenna elements 24, 26, 27 and 28. Elemer 24 and 26 are spoke elements which extend from tl spacecraft 12 to the ends of elements 27 and 28. El ments 27 and 28 are also conductive and are connected by an appropriate terminating resistor 30.

The antenna assembly 22 likewise includes conductive spoke elements 32 and 34 which are terminally connected to conductive elements 35 and 36 which are connected by a terminating resistor 38.

The antenna elements 27, 28, 35, and 36 form part of the net periphery 16. The other non-antenna filamentary elements 14 of the net 16 are formed of a nonconductive material such as Mylar or Fiberglas. Similarly, the non-antenna spoke elements 18 can be formed of Mylar or Fiberglas. The antenna elements on the other hand must be formed of a conductive material such as aluminum or aluminum-coated Mylar for example.

As previously noted, it is desired to place the antenna structure of FIGURE 1 in an orbit around the earth at a height such that it is capable of receiving relatively low frequency signals which are unable to penetrate the ionosphere and magnetosphere. In order for the antenna structure 10 to be useful, it is necessary that it be of light weight so that it can be economically placed in orbit and it is also necessary that it can be structurally stabilized once it has achieved orbit. In accordance with the basic concept of the present invention, the net 10 is initially tightly wound around the spacecraft 16. The net 10 is deployed by spinning the spacecraft to thereby gradually throw the net outwardly. The antenna structure is stabilized by ultimately rotating both the net 10 and spacecraft 12 at the same spin velocity about the spacecraft axis at a rate which provides sufficient centrifugal force to maintain all of the filamentary elements in tension but insufficient to exceed the tensile strength of any of the filamentary elements. In order to facilitate the initial deployment of the net structure and establishment of the appropriate centrifugal forces, the net structure 16 can be weighted by the disposition of weights 40 at appropriate positions on the periphery 16 thereof.

Attention is now called to FIGURE 2 which illustrates a typical spacecraft which can be employed in accordance with the present invention.

As can be seen in FIGURE 2, the spacecraft 12 comprises a disc-like structure including a lower housing portion 50 and an upper housing portion 51 disposed thereover. The upper housing portion 51 externally carries a power source 52 which can for example comprise a radio isotope thermal electric generator. Three booms 54, 56, and 58 are coupled to the lower housing portion 50 by hinges 60. Initially, as shown in FIGURE 2, the booms are pivoted upwardly in an inoperative position to fit within a fairing for placement in orbit. After the spacecraft 12 has been placed in orbit, the booms 54, 56, and 58 are released and locked into the position shown in FIGURE 4. The booms are employed to carry small propulsion systems 62 which are used, as will be discussed hereinafter, to provide thrust during deployment. In addition to carrying the propulsion systems, at least one of the booms carries an omnidirectional antenna (not shown) which is used for ground communication. That is, the omnidirectional antenna is used both to transmit to ground signal received by the antenna assemblies 20 and 22 and to receive command signal transmitted from ground.

As shown in FIGURE 3, the net structure 10 is wound about central shaft 64 which structurally forms part of the spacecraft 12 extending between housing portions 50 and 51. The filamentary elements forming the net structure 10 preferably comprise flat strips of tape. For example, the nonconductive non-antenna elements can comprise appropriate Mylar tape having a quarter inch width and a one mil thickness. The conductive antenna elements can be formed of similarly dimensioned aluminum tape. The proper dimensions for the conductive antenna elements, of course, depend not only upon the structural characteristics of the elements but also upon the electrical characteristics, inasmuch as it should be clear that as the dimensions of the net structure increase, the electrical loss in the conductive antenna elements increases, meaning that conductive elements of larger cross-section must be employed.

The elements of the net 10 are wound around the shaft 64 thus forming a plurality of coaxial layers. In accordance with a preferred embodiment of the invention, pressure sensitive adhesive material is applied to each face of the filamentary tape elements. Prior to deployment, this adhesive material tends to retain the net tightly wound around the shaft 64.

A circumferential slot 70 is defined in the upper housing portion 51 in alignment with the tape elements wound around the shaft 64. The slot 70 has a width slightly greater than the width of the filamentary tape elements. The previously mentioned weights 40 secured to the filamentary elements of the net periphery 16 are exposed through the slot 70 and prior to the initiation of deployment are retained in a fixed position on the housing portion 51 by a suitable retention device 72. The retention device 72 can be released in response to a command signal from ground or in response to other predetermined conditions.

Figure 5A:
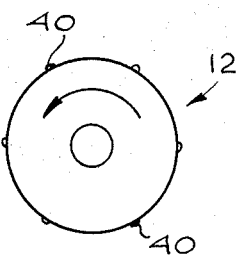
FIGURES 5a–5d are a schematic representation illu: trating a net in accordance with the invention bein deployed from the spacecraft.

The spacecraft 12 with net 10 tightly wound around the shaft 64 is placed into a desired orbit by conventional propellant devices. Preferably, a spinning final propulsion stage (e.g. solid propellant) is employed so as to provide the spacecraft with an initial spin velocity after separation. After the spacecraft is in orbit, the booms 54, 56, and 58 are pivoted downwardly (FIGURE 4) and locked into place. Upon command, either from the ground or automatically, the retention devices 72 are then released by squibs or other means thereby freeing the weights 40 to swing out from the spacecraft so as to start to unpeel successive layers of tape as shown in FIGURES 5(a), (b).

Figure 5B:
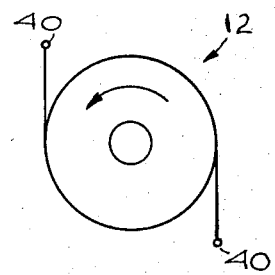
Figure 5C:
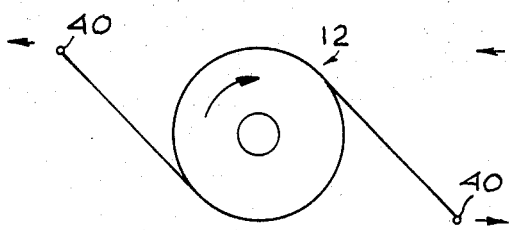

In the absence of the sticking force, i.e. the force tending to resist the weights from moving away from the spacecraft, the weights would initially tend to move away along a tangent at a speed substantially equal to the spacecraft's circumferential speed. As a consequence, the forces resulting from the departing weights create a force along the unwound tape portions providing a torque on the spacecraft acting to reverse its direction of spin. More particularly, note the deployment sequence schematically illustrated in FIGURES 5(a)–(c). FIGURE 5(a) illustrates the spacecraft prior to release of the weights 40 with the spacecraft spinning in a counterclockwise direction. FIGURE 5(b) illustrates the weights immediately after being released. FIGURE 5(c) shows the weights sometime later, it being clear that their velocity results in a reverse torque being applied to the spacecraft which could change its direction of spin to the clockwise direction illustrated. If the direction of spin reverses, as shown in FIGURE 5(c), then all of the kinetic energy of the weights undesirably acts in a radial direction, rather than tending to maintain the spin velocity.

Figure 5D:
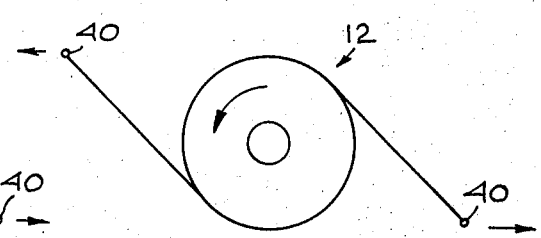

FIGURE 5(d) indicates what happens in the presence of the sticking force; i.e. the escaping weights exercise a reverse torque which only acts to slow the spacecraft's spin rate to a point at which the resulting force is insufficient to unpeel the tape further. In the presence of a sufficient sticking force, the spin direction of the spacecraft cannot reverse. Thus, the pressure sensitive adhesive material adhering adjacent tape layers together effectively acts as an energy sink absorbing energy which would otherwise act to increase the radial velocity of the unwinding tape.

Figure 6:
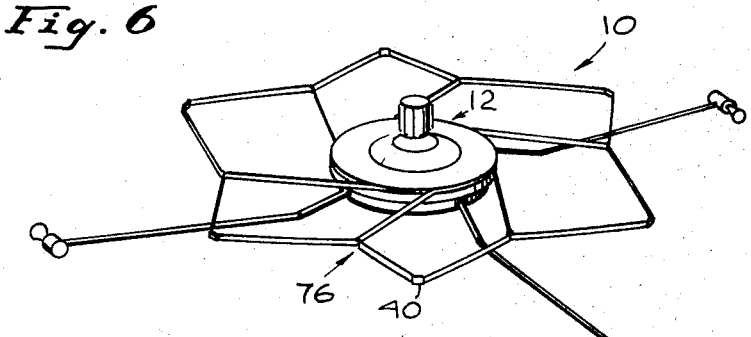
FIGURE 6 is a perspective view of the spacecra illustrating the net in accordance with the present ir vention being deployed therefrom.
Figure 7:
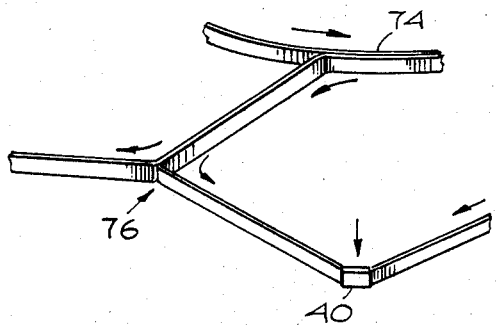
FIGURE 7 is an enlarged perspective view illustratin in detail the characteristics of the filamentary elemen forming the net.

FIGURES 6 and 7 illustrate the spacecraft and net after an initial deployment phase. Note particularly in FIGURE 7 that sticking will occur both at the spacecraft at 74 where two tape elements together are peeled from the layers and remote from the spacecraft at 76 where the tape elements are separated from one another.

Because it is difficult and generally undesirable to impart an initial spin speed to the spacecraft to permit the net to fully deploy and still retain a speed sufficient to create adequate centrifugal forces required for stability, additional energy in the form of an appropriately applied thrust must be added. In addition, any reasonable initial angular momentum possessed by the spacecraft is essentially negligible when compared with the desired finally deployed angular momentum. For these reasons, the spin propulsion system carried at the ends of the booms 54, 56, and 58 is provided. Each spin propulsion system can comprise for example, a known monopropellant propulsion system. Preferably such a propulsion system would provide a constant thrust serving to increase the angular momentum of the spinning spacecraft and net thereby forcing further deployment of the net at a rate controlled largely by the sticking force between the adjacent tape layers. The amount of thrust added is dependent upon the requirement that after full deployment is reached, and before the final spin speed is achieved, the torque applied by the spin propulsion should not exceed the counter torque applied by the centrifugal tension in the spoke elements. If the torque added by the propulsion system was unduly excessive, rewinding of the tape could occur after full deployment. However, because the sticking force is sized to insure that full deployment is reached somewhat before the final spin speed is achieved and because a torque much larger than that required to maintain deployment would be required to rewind a fully deployed net, these requirements are not very difficult to satisfy.

Figure 8:
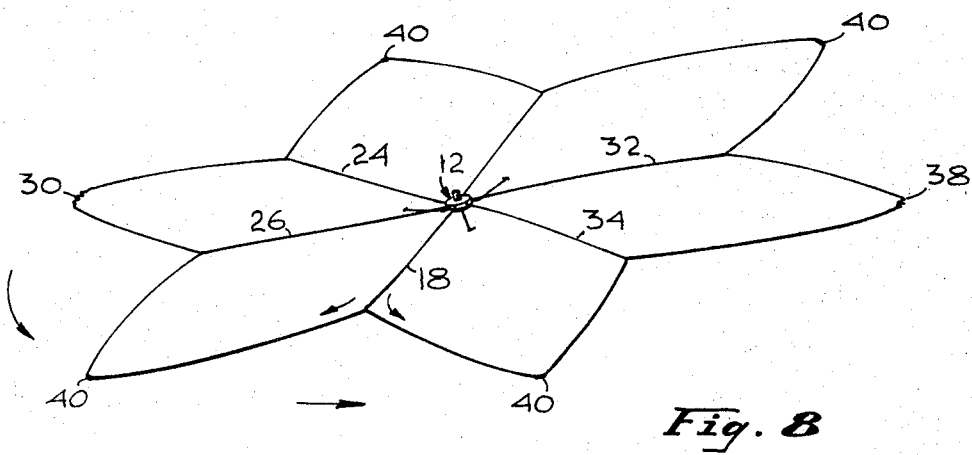
FIGURE 8 is a perspective view illustrating th antenna structure at a later stage of deployment.
Figure 9:
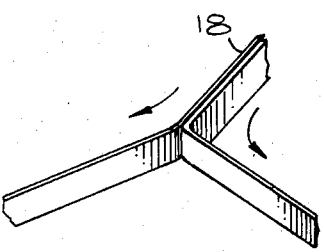
FIGURE 9 is an enlarged perspective view furth illustrating in detail the nature of the filamentary el ments and the manner in which they cooperate.

With the added thrust provided by the spin propulsion system, deployment of the net continues as shown in FIGURES 8 and 9. No control of deployment is required since the system can be considered to be self-governing in view of the fact that the sticking force between the adjacent tape layers acts as a sink for radial energy. For example, if the sticking force is unusually large between two adjacent tapes, the angle between them changes, resulting in a reduction of the tensile force required to cause peeling and leading to a new slightly asymmetric, but stable deployment configuration. Conversely, if the force is unusually weak, the angle between the two strips will get narrower leading also to a stable configuruation. Deployment in this manner continues until the net is fully deployed after which the propulsion system will continue to function until the desired final spin speed is established, preferably when fuel is exhausted. To minimize sharp transients at the end of engine burning, it is desirable that the propulsion engines be extinguished gradually.

Figure 10:
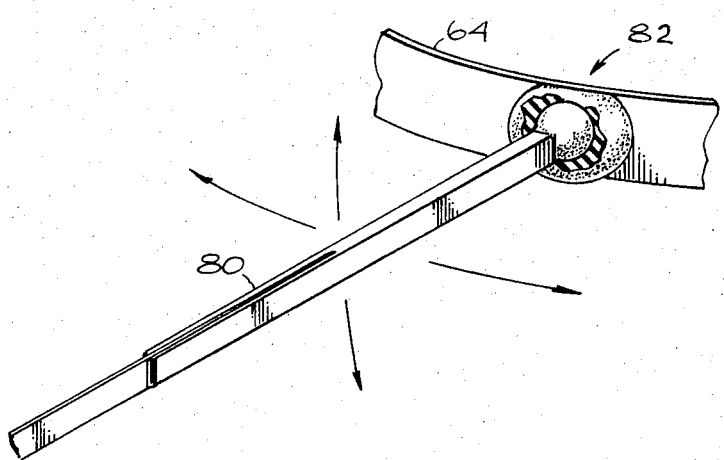
FIGURE 10 is a schematic representation illustratir the manner in which the net spoke elements are couple to the spacecraft.

During the course of deploying the net, the forces acting to unpeel the tape elements tend to make the net completely stable, damping out perturbing forces. However, once the net is fully deployed, perturbing forces, such as result from the difference in gravity gradient on the net and spacecraft must be damped out. For this purpose, each net spoke is attached by a short arm 80 (FIGURE 10) to the spacecraft 12. The arm is preferably curved so that it can conform to the spacecraft shaft 64 prior to full deployment. The arm 80 is coupled to the spacecraft by a universal joint 82 which permits the arm and spoke element coupled thereto to rotate about both the spacecraft axis and an axis perpendicular to the spacecraft axis. In order to prevent perturbing forces from setting up oscillations between the spoke elements and the spacecraft, damping means are provided around the universal joint. The damping means can comprise any of several devices such as a rubber-like solid producing viscous damping or a magnetic hysteresis energy damper. In any event, the damping means serves to remove perturbations within the net and between the net and spacecraft in a reasonable period of time thereby enabling the system to be completely stable regardless of any perturbing forces which it encounters.

From the foregoing, it should be appreciated that a method of deploying a structure and a large lightweight structure suitable for being so deployed have been disclosed herein. Although the specifically disclosed embodiment of the invention is directed to a particular antenn structure, it will be appreciated by those skilled in th art that other antenna structures and structures useful fo other purposes can also be constructed and deployed i accordance with the teachings herein. Further, althoug the invention has been disclosed employing a pressur sensitive adhesive material between tape elements to prc vide a force for resisting the movement of the net fror the spacecraft, other techniques can be used to introduc this force including both magnetic and mechanical tecł niques or various combinations thereof and elements othe than tape elements can be used to form the net. More over, although the use of a sticking force eliminates tł need for a complex control system, it is pointed out thε a structure in accordance with the invention can be dɛ ployed without use of the sticking force by properly cor trolling the added thrust.

It is recognized that other modifications and variation falling within the spirit and scope of the invention wi occur to those skilled in the art and it is intended thε these be encompassed by the appended claims.

The embodiments of the invention in which an e: clusive property or privilege is claimed are defined ε follows:

1. A structure suitable for being deployed in spac comprising:
    a spacecraft;
    a net formed of non-rigid filamentary elements couple to said spacecraft;
    said net being wound around said spacecraft and bein adapted to unwind in response to sufficient rotation; motion of said spacecraft; and
    means appropriately weighting said net for causing desired rotational motion to apply centrifugal forc( to said elements sufficient to maintain them in tei sion but insufficient to exceed their tensile strengtl 2. The structure of claim 1 including releasable meaı preventing said net from unwinding.

3. The structure of claim 1 including means tendir to limit the rate at which said net unwinds from saı spacecraft in response to said rotational motion.

4. The structure of claim 1 including energy absorbir means for controlling the unwinding of said net.

5. The structure of claim 4 wherein said energy al sorbing means includes adhesive material disposed on saː filamentary elements and tending to resist the unwindir of said net.

6. The structure of claim 1 wherein said filamentaı elements comprise pieces of flat tape.

7. The structure of claim 1 wherein said net is con prised of a first plurality of non-rigid filamentary elemen couplied end to end forming a closed net periphery ar a second plurality of non-rigid filamentary elements;
    first coupling means coupling a first end of each ‹ said second plurality of elements to said spacecraɪ and
    second coupling means coupling a second end of ea( of said second plurality of elements to said peripher 8. The structure of claim 7 wherein said first coupliı means includes means permitting limited rotational mov ment of said second elements about the axis of said spac craft and about an axis extending perpendicular to sa spacecraft axis.

9. The structure of claim 8 including damping mea for damping out oscillations between said spacecraft aı said second elements.

10. The structure of claim 1 including means carri⋅ by said spacecraft capable of applying a thrust there for increasing the angular momentum of said structuɪ

11. A large lightweight antenna structure capable being deployed in space comprising:
    a spacecraft;
    a net formed of non-rigid filamentary elements, i cluding at least some electrically conductive anten elements, coupled to said spacecraft and wound therearound;

retaining means for preventing said net from unwinding;

means for releasing said retaining means thus permitting said antenna to unwind in response to sufficient angular motion of said spacecraft, and means appropriately weighting said net causing the angular motion to apply centrifugal forces to said elements sufficient to maintain them in tension but insufficient to exceed their tensile strength.

12. The antenna structure of claim 11 further including means carried by said spacecraft capable of applying a thrust thereto for increasing the angular momentum of said structure.

13. The antenna structure of claim 11 wherein said net is comprised of a first plurality of non-rigid filamentary elements coupled end to end forming a closed net periphery and a second plurality of non-rigid filamentary elements;

first coupling means coupling a first end of each of said second plurality of elements to said spacecraft; and second coupling means coupling a second end of each of said second plurality of elements to said periphery.

14. The antenna structure of claim 13 wherein certain ones of said filamentary elements are electrically conductive and comprise antenna elements.

15. The antenna structure of claim 13 wherein said first and second plurality of elements are comprised of antenna and support elements respectively being formed of electrically conductive and nonconductive material.

16. The antenna structure of claim 15 including energy absorbing means for controlling the unwinding of said net.

17. The antenna structure of claim 16 wherein said energy absorbing means includes adhesive material disposed on said filamentary elements and tending to resist the unwinding of said net.

18. The antenna structure of claim 17 wherein said filamentary elements comprise pieces of flat tape.

No references cited.

ELI LIEBERMAN, *Primary Examiner.*

U.S. Cl. X.R.

244—1; 343—795, 877